United States Patent Office 3,315,900
Patented Apr. 25, 1967

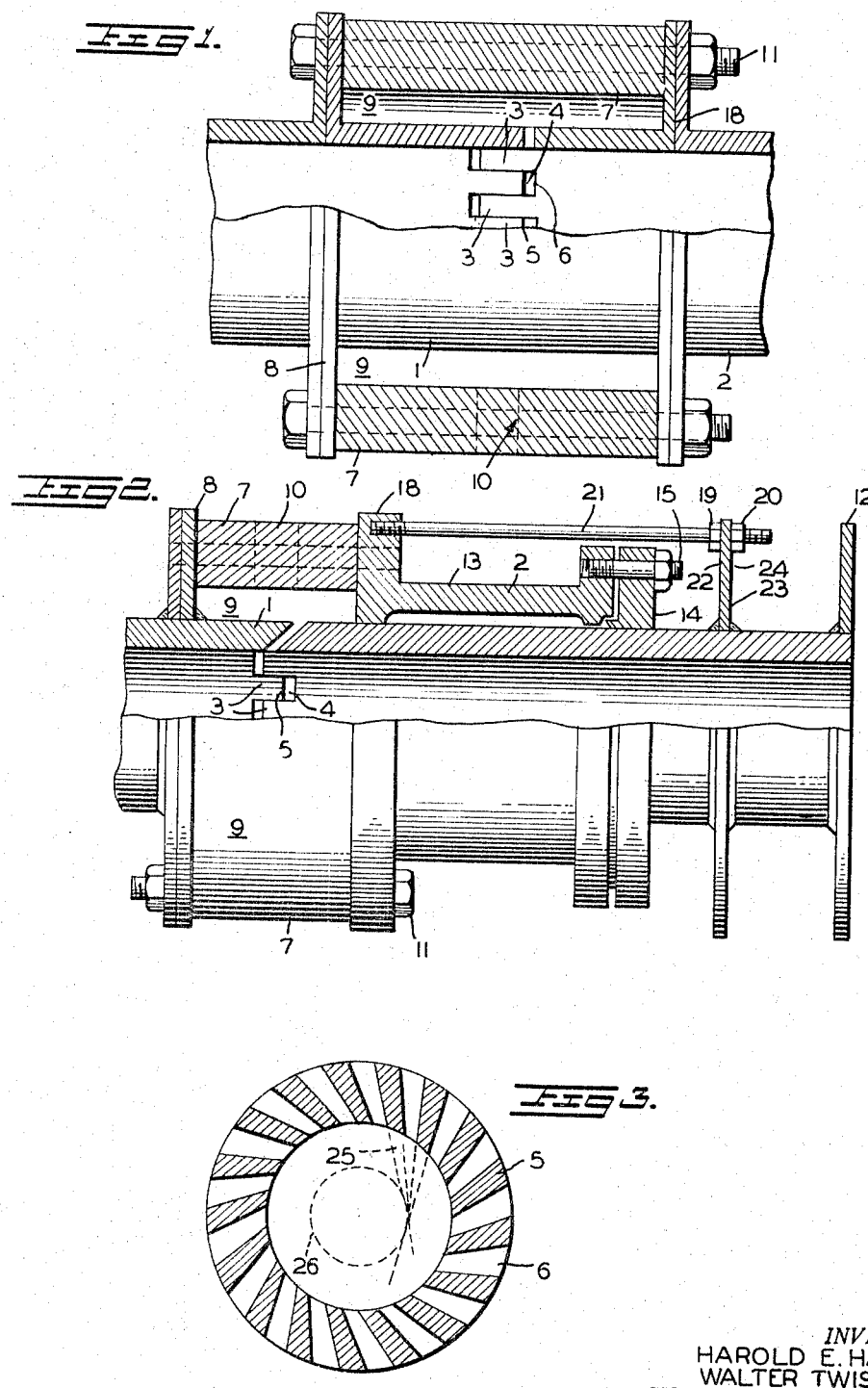

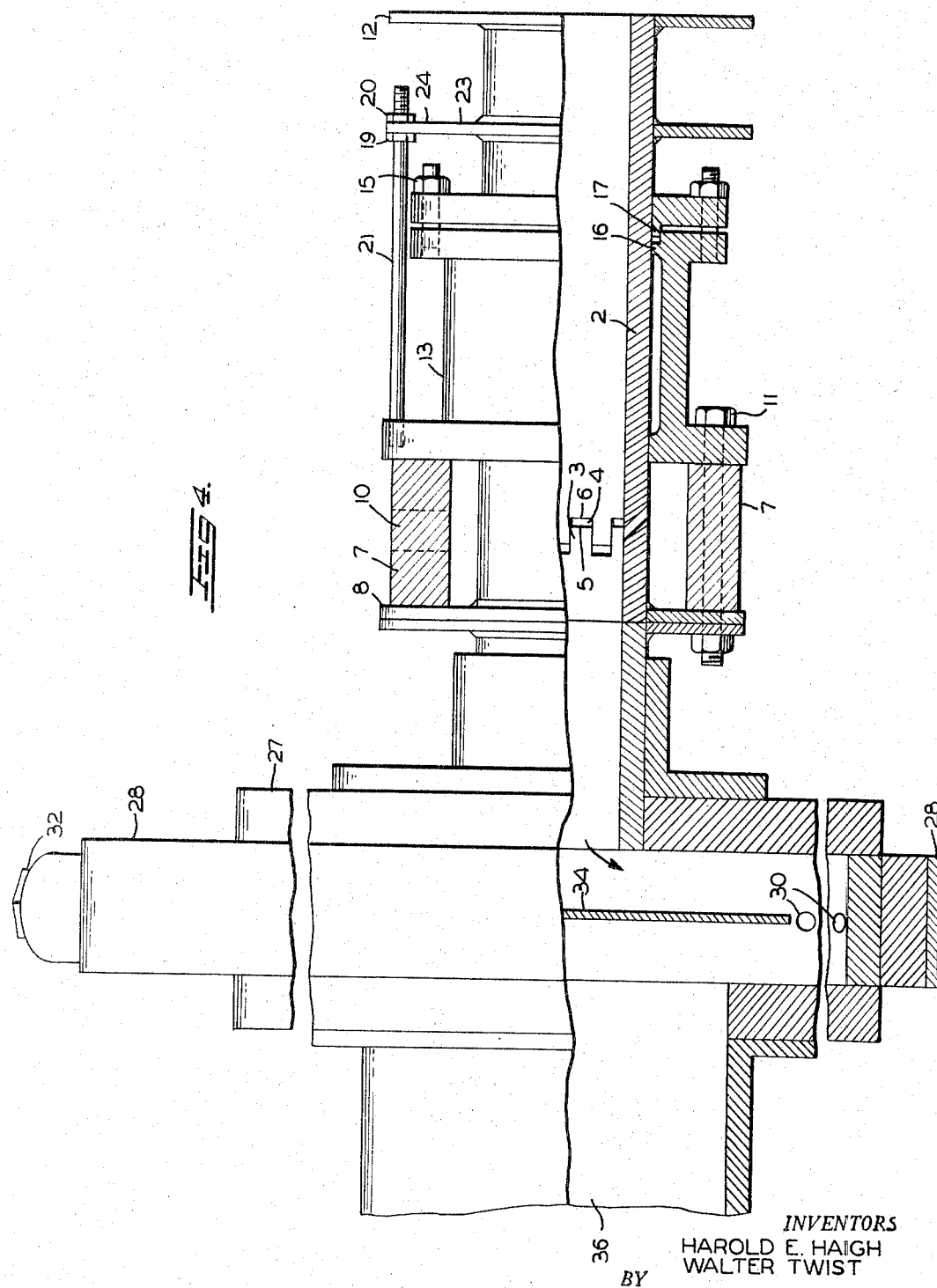

3,315,900
APPARATUS FOR PULVERIZING
Walter Twist, Billingham, and Harold Edward Haigh, Norton, England, assignors to British Titan Products Company Limited, Durham, England, a corporation of the United Kingdom
Filed May 13, 1964, Ser. No. 367,118
14 Claims. (Cl. 241—39)

The present invention relates to apparatus for the fluid energy pulverization of particulate solids.

In our U.S. Patent 3,260,467 there is described a fluid energy pulverizer consisting of two conduits aligned in end to end relationship, the adjacent ends of the conduits being spaced apart and means for directing inwardly between the adjacent ends a fluid at relatively high pressure.

In certain circumstances using this type of pulverizer it may be advantageous to introduce the fluid in separate streams, for example to impart a rotating motion to this stream of pulverized particulate solids as it passes along the pulverizer. This may, for example, assist in the pulverizing and in the classification of the pulverized solids by tending to thrust the larger particles against the side of the conduit.

This rotating motion to the stream of pulverized solids is particularly valuable when the pulverizers of this type are used in conjunction with a more conventional type of fluid energy pulverizer having a series of jets for the introduction of fluid at high pressure around the periphery but having central feed and exit orifices. The use of two pulverizers in conjunction with each other is to provide a double pulverization of particulate solids which is frequently very effective.

One pulverizer having central feed and exit orifices which is particularly suitable for use in conjunction with the pulverizers of the present invention is described in Belgian Patent 615,852.

It is an object of the present invention to provide apparatus for fluid energy pulverization which is a modification of that described in our U.S. Patent 3,260,467.

Accordingly, the present invention is an apparatus for fluid energy pulverization of particulate solids comprising two conduits aligned in end to end relationship wherein the adjacent ends of the conduits form a number of interlocking teeth and means to direct inwardly between the teeth a fluid under pressure.

The conduits are preferably straight pipes of circular cross section and of similar diameter to each other. They may, however, be of elliptical or other cross section and may, if desired, be fed by curved supply pipes.

Conduits having an internal diameter in the range 1″ to 12″ particularly in the range 1″ to 6″ may conveniently be used in the present invention.

The thickness of the walls of the conduits should be sufficient to resist the pressure of fluid within the conduits and it should also preferably be sufficient to give good direction to the compressible fluid introduced through the apertures between the conduits.

The conduits are conveniently made of, or lined with, a material which has satisfactory resistance to any abrasive or corrosive material with which it may come in contact.

The ends of the conduits are so formed that when the ends are adjacent and aligned in end to end relationship a number of interlocking teeth are formed. The number of teeth may vary as desired and with the diameter of the conduit but it is, in general, preferred to form as many interlocking teeth as possible having due regard to the strength of the teeth, cost of production and other engineering problems. For example, in the case of conduits 1.6 inches internal diameter having walls 0.5 inch thick, it has been found convenient to provide 16 teeth evenly spaced around the ends of the conduit and separated by recesses between the teeth. The teeth normally have a flat crown as have the floors of the opposing recesses into which the teeth project.

It is preferred that the space between the sides or flanks of the teeth, when interlocked, should be as small as possible consistent with ease of longitudinal motion and allowing for any expansion during use.

The main space for the introduction between the conduits of fluid under pressure is preferably between the crown of the tooth on one conduit and the floor of the opposing recess into which that tooth projects on the other conduit. By this means it is ensured that the fluid enters the conduit as a stream substantially the width of the crown of the tooth having its broadest dimension in the plane of the cross section of the conduit, thus forming, with the other streams, a "curtain" of fluid across the ends of the conduit through which the particulate material to be pulverized must pass.

Where the fluid passes between the crowns of the teeth and the base of the opposing recess the fluid tends to form two "curtains" separated by the length of the teeth through which the particulate material must pass.

The crowns of the teeth and the floors of the opposing recesses may be formed at right angles to the longitudinal axis of the conduits, if desired, or they may be formed so as to direct the flow of fluid introduced between the conduits at an oblique angle to this axis. In particular, the ends of the conduits are preferably formed to provide a velocity component in the same direction as the flow of particulate material through the conduits, thus assisting the movement of the particulate material through the pulverizer when the fluid is introduced. Alternatively, the fluid may be so directed to give a velocity component in the opposite direction to that of the flow of particulate material, for example, to cause turbulence. It is preferred that the adjacent ends of the conduits are formed at an angle between 45° and 90° to the longitudinal axis of the conduit.

A convenient distance between the crowns of the teeth and the floor of the recesses with which the teeth project has been found to be in the range 0.05 inch to 0.5 inch. When pulverizing finely-divided titanium dioxide to produce titanium dioxide pigment, for example, a particularly suitable distance has been found to be in the range 0.1 to 0.3 inch.

In order to impart a rotating motion to the flow of particulate solids passing through the conduits and thus to give a helical path to the pulverized particulate solid the teeth are preferably formed in such a manner that when the sides of the teeth are projected as imaginary straight lines across the interior of the conduit, the lines will be tangential to an imaginary circle concentric with the longitudinal axis of the conduits but smaller than the interior diameter of the conduit and the tangents will progress in a regular manner around the circumference of that circle. By this means the fluid through each aperture assists in imparting the rotating motion to the stream of particulate material.

This rotating motion gives some assistance in pulverization and in classification of the particulate solid since the larger particles tend to be preferentially thrown against the side of the conduit.

If the rotating stream of pulverized particulate material is supplied to a more conventional fluid energy pulverizer having central feed and exit orifices while still following a helical path this classification due to the rotation of the stream is of particular value since heavier particles which require further pulverization are preferentially ejected outwards towards the periphery of the second fluid energy pulverizer as this stream enters the pulverizer. The finer particles, on the other hand, tend to remain in the centre of the pulverizer and to pass to the exit orifice by a shorter path.

Pulverizers with a central feed orifice are normally provided with a deflector plate to deflect all the incoming material to be pulverized toward the periphery of the device. When the rotating motion is suppled to the feed by the process of the present invention it may be possible to dispense with such deflector plates.

The fluid introduced between the adjacent ends of the conduits is preferably steam although other fluids including gases such as air may be used if desired.

The pressure at which the fluid is supplied may vary, depending, for example, upon the material to be pulverized. In the case of titanium dioxide pigments steam at pressures in the range of about 20 to 500 p.s.i.g. particularly 80 to 250 have been found convenient. It is preferred that the steam, when used, should have a level of superheat sufficient to prevent excessive condensation in the device and yet not to be at too high a temperature to necessitate an inconvenient amount of cooling of the pigment before bagging.

It is also preferred that the ratio of pressure at the outside of the conduit and the pressure inside the conduit should be in the range of about 2:1 to 50:1 particularly in the range 5:1 to 20:1. If desired, a device to provide reduced pressure such as a suction pump can be applied to the outlet of the pulverizer to assist in obtaining such a ratio of pressures.

The material to be pulverized will generally be injected into the open end of one conduit (i.e. the opposite end to that adjacent to the other conduit) by known means for example by a steam injector wherein the material is supplied to a steam jet passing through a restricted orifice into the conduit. Alternatively, the present apparatus may be set up in a substantially vertical position and the material allowed to drop into the conduit under the influence of gravity. This method may be particularly effective if the adjacent ends of the conduit are shaped to give the compressible fluid introduced between these ends a velocity component in the same general direction as that of the flow of the particulate material through the apparatus.

If desired, two or more of the pulverizers of the present invention may be set up in series in order to provide particularly good pulverization.

FIGURES I and II accompanying this specification show in partial section different diagrammatic representations of embodiments of the present invention. FIGURE III shows an end view of one conduit (the end of the other conduit is substantially the same). FIGURE IV shows the combination of the embodiment of FIGURE II with the pulverizer shown in Belgian Patent 615,852 as FIGURE 8.

FIGURE I shows the surface of the conduits in one form of the device in which the manifold has been partially sectioned. The two conduits 1 and 2 are formed with interlocking teeth 3 which, when in position, leaves spaces 4 between the crown of a tooth 5 on one conduit and the base of a recess 6 between the teeth on the other conduit. The spaces are maintained by the insertion of a distance piece 7 between the flanges 8 and 18 on the conduits. The distance piece, in co-operation with the flanges forms a manifold 9 to which steam or other gas under pressure is supplied through part 10. The distance piece is maintained in position by bolts 11 passing through the distance piece and the flanges. If the spaces 4 are to be increased or decreased in width the distance piece is replaced by one of the appropriate lengths.

FIGURE II is a partial horizontal cross section through a pulverizer in which the distance between the crowns of the teeth and base of the opposing recesses is adjustable without replacing a distance piece. The parts corresponding to the parts in FIGURE I have the same reference numerals.

Conduit 2 carries a flange 18 and is longer than conduit 1. It is not attached to flange 18 but passes through it and through the extension 13 of this flange and its attached gland.

The latter comprises insert 14 which co-operates with flange extension 13 and which is tightened onto the extension by means of bolts 15 thus compressing between surfaces 16 and 17 of the insert and extension respectively a suitable compressible material to form a fluid-tight seal on the surface of the conduit 2.

Movement of conduit 2 and consequent adjustment of spaces 4 is effected by loosening nuts 19 and 20 on the bolts 21 (of which only one is shown) and thereafter either by screwing nuts 19 onto the face 22 of flange fixed to conduit 2 (thus increasing the width of the space between adjacent ends of the conduits) and thereafter tightening nuts 20 onto face 24 of flange 23 to prevent further movement, or by screwing nuts 20 onto face 24 (to decrease the width of the space between adjacent ends of the conduits) and then tightening nuts 19 onto face 22 to prevent further movement.

FIGURE III shows tooth 5 separated by recesses 6. The imaginary lines 25 are projected from the sides of the teeth across the interior of the conduit to form tangents to an imaginary circle 26 which is concentric with the longitudinal axis of the conduit but is of smaller diameter than the internal diameter of the conduit.

*Example 1*

A device similar to that described in FIGURES II and III above was set up. The internal diameter of the conduits was 1.6 inches and the walls of the conduits were 0.5 inch thick. Sixteen teeth were formed on the end of both conduits and the imaginary circle 26 was of 0.6625 inch diameter. The spaces 4 were 0.2 inch wide (measured when the apparatus was at room temperature). The crowns of the teeth and the bases of the corresponding recesses were formed at an angle of 45° to the longitudinal axis of the conduits in the direction of flow of the pigment through the apparatus.

Steam at 200 p.s.i.g. was introduced into the distribution chamber and rutile titanium dioxide pigment coated with $Al_2O_3$ (2%) and $TiO_2$ (1.5%) was injected into the pulverizer through a 0.175 inch steam injector at the various rates and steam/pigment ratios shown in the table. In some cases the pigment was passed twice through the pulverizer.

The pigment, after milling, was assessed for tinting strength by the Reynolds Blue method.

The results obtained were as follows:

TABLE

| Steam/pigment ratio | Pigment rate, lbs./hr. | Tinting strength | No. of passes |
|---|---|---|---|
| 2.5 | 600 | 1,650 | 1 |
| 1.9 | 800 | 1,650 | 1 |
| 5.0 | 600 | 1,740 | 2 |
| 3.9 | 800 | 1,710 | 2 |
| 3.0 | 1,000 | 1,700 | 2 |
| 2.5 | 1,200 | 1,700 | 2 |
| 1.1 | 1,400 | 1,650 | 1 |
| 2.2 | 1,400 | 1,710 | 2 |

The tinting strength of the pigment before milling was 1510.

It is preferred that the length of the teeth on the ends of the conduits should not be greater than about 2" from the base of the teeth to the crown, for example, not greater than about 1".

FIGURE IV shows the combination of the pulverizer of FIGURE II with the pulverizer described in the aforementioned Belgian Patent 615,852. The parts corresponding to the parts in FIGURE II have the same reference numerals. The balance of the structure is a fluid energy mill joined to the embodiment of FIGURE II through flange 8. The wall of the mill is represented by 27. A manifold 28 around the periphery of the mill is supplied with fluid, usually steam, introduced at high pressure; steam passes through nozzles 40 into the fluid energy mill. A removable plug 32 on the periphery of manifold 28 provides access to nozzles 40 should these become blocked. Deflector plate 34 prevents material entering through the flanged opening from passing out of the exit port 36. Thus, material being treated is milled in the tube mill and the products then pass through the entry port in flange 8 and are subjected to further milling in the fluid energy mill. The fluid energy mill, of course, also provides some classification, that is, the heavier and unmilled particles tend to be thrown towards the periphery of the fluid energy mill and remain there until their size is reduced, whereas the adequately milled particles tend to pass through the exit port 36 more quickly. In the tube mill embodiment in which the sides of the teeth are tangential to the circle of smaller diameter than the tube mill, there is a swirling motion imparted which continues after the material has left the tube mill and entered the fluid energy mill, and the swirling action imparts a centrifugal force to the particles in direct proportion to their size, thus insuring that the larger particles are more effectively impelled towards the perimeter of the mill. The operation of the fluid energy mill is, of course, described in much greater detail in the aforementioned Belgian patent.

What is claimed is:

1. Apparatus for the fluid energy pulverization of particulate solids comprising two conduits aligned in end to end relationship wherein the adjacent ends of the conduits form a number of interlocking teeth and means to direct inwardly between the teeth a fluid under pressure.

2. Apparatus as claimed in claim 1 wherein the conduits are of circular cross section and of equal internal and external diameter.

3. Apparatus as claimed in claim 1 wherein the sides of the interlocking teeth are so shaped that when they are projected in imaginary straight lines across the interior of the conduit the imaginary lines are tangential to an imaginary circle concentric with the longitudinal axis of the conduit but of smaller diameter than the internal diameter of the conduit.

4. Apparatus as claimed in claim 3 wherein the crowns of the teeth and the floor of the opposing recesses into which they fit are formed at an angle of between 45° and 90° to the longitudinal axis of the conduits.

5. Apparatus as claimed in claim 1 wherein the distance between the crown of the teeth and the floor of the opposing recesses is in the range 0.05 to 0.5 inch.

6. Apparatus as claimed in claim 5 wherein the distance is in the range 0.1 to 0.3 inch.

7. Apparatus as claimed in claim 1 wherein a manifold is located around the interlocking teeth of the conduits and including means for feeding into the manifold the fluid under pressure.

8. Apparatus as claimed in claim 7 wherein each conduit is provided with a flange around its periphery, the two flanges being separated by a tubular distance piece and wherein the two flanges, distance piece and exterior surface of the conduits together form the manifold.

9. Apparatus as claimed in claim 8 which includes means for varying the space between the crown of the teeth and the floor of the opposing recess.

10. Apparatus as claimed in claim 9 wherein one conduit has a manifold attached thereto and the other conduit is movable longitudinally relative to the conduit to which the manifold is attached and there is provided a fluid-tight gland between the manifold and the exterior of the movable conduit.

11. Apparatus for the fluid energy pulverization of particulate solids comprising an apparatus as claimed in claim 3 in communication with the central feed orifice of a second fluid energy pulverizer having jets for the introduction of fluid around the periphery and a central orifice for the discharge of pulverized material.

12. Apparatus for the fluid energy pulverization of particulate solids comprising two conduits of circular cross section and of equal internal and external diameter aligned in end-to-end relationship wherein the adjacent ends of the conduits form a number of interlocking teeth, said interlocking teeth so shaped that their projections in imaginary straight lines across the interior of the conduit are tangential to an imaginary circle concentric with the longitudinal axis of the conduits but of smaller diameter than the internal diameter of the conduits, the crowns of the teeth and the floor of the opposing recesses into which they fit spaced apart a distance in the range of 0.05 to 0.5 inch and formed at an angle of between 45° and 90° to the longitudinal axis of the conduits; a manifold in surrounding relation to the interlocking teeth of said conduits adapted to direct inwardly between said teeth a fluid under pressure; and means for feeding into said manifold fluid under pressure.

13. Apparatus as claimed in claim 12 wherein each conduit is provided with a flange around its periphery, the two flanges being separated by a tubular distance piece and wherein the two flanges, distance piece and exterior surface of the conduits together form the manifold.

14. Apparatus as claimed in claim 13 in which said manifold is attached to one of said conduits and the other of said conduits is movable relative to said first conduit and said manifold and in which said apparatus additionally comprises a fluid-tight gland between said manifold and the exterior of said movable conduit to effect closure therebetween without preventing movement of said movable conduit, and positioning means for positioning said movable conduit relative to said first conduit whereby the space between the crown of the interlocking teeth and the floor of the opposing recesses may be varied.

References Cited by the Examiner

UNITED STATES PATENTS

| | | | |
|---|---|---|---|
| 2,032,827 | 3/1936 | Andrews | 241—5 |
| 2,753,123 | 7/1956 | Woellhaf | 241—39 |
| 2,813,318 | 11/1957 | Horth | 241—152 X |
| 2,980,345 | 4/1961 | Kececioglu | 241—39 X |
| 2,997,245 | 8/1961 | Nilsson | 241—39 X |
| 3,184,168 | 5/1965 | Feld | 241—5 |

WILLIAM W. DYER, Jr., *Primary Examiner.*

HARRY F. PEPPER, Jr., *Assistant Examiner.*